No. 742,981. PATENTED NOV. 3, 1903.
J. B. GATEWOOD.
TOBACCO HARVESTING KNIFE.
APPLICATION FILED APR. 15, 1903.
NO MODEL.
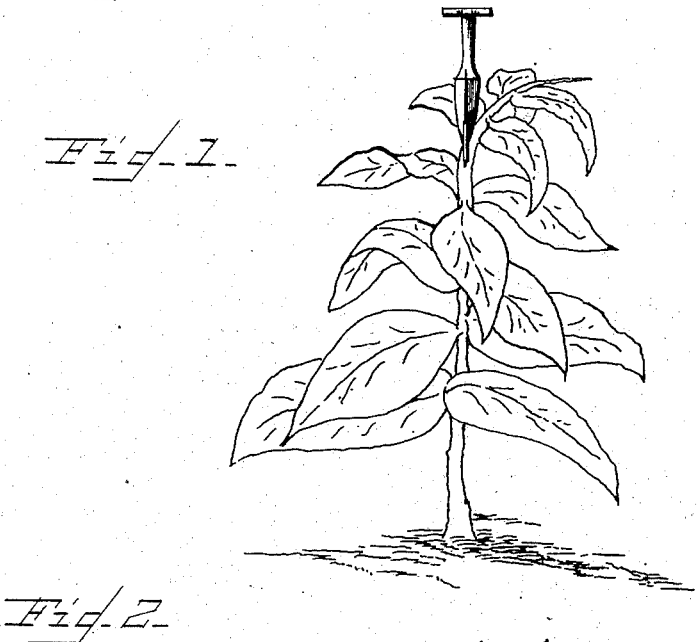
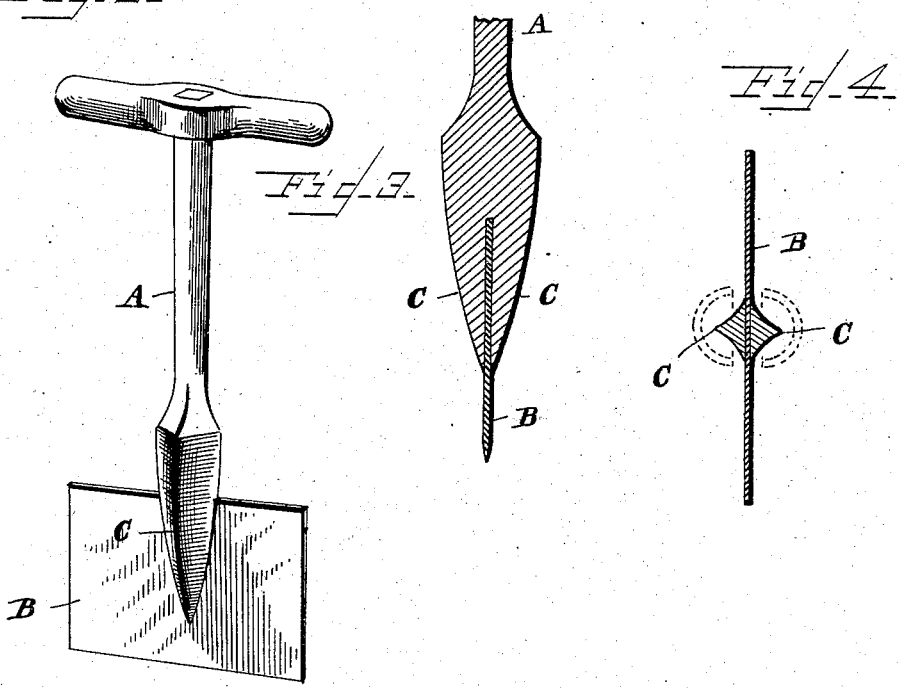
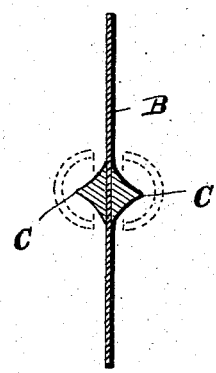
WITNESSES
Edwin L. Yewell
Charles Lee Cooke.
INVENTOR
James B. Gatewood
By Davis & Davis
Attorneys.

No. 742,981. Patented November 3, 1903.

UNITED STATES PATENT OFFICE.

JAMES B. GATEWOOD, OF HUNTINGTON, WEST VIRGINIA.

TOBACCO-HARVESTING KNIFE.

SPECIFICATION forming part of Letters Patent No. 742,981, dated November 3, 1903.

Application filed April 15, 1903. Serial No. 152,730. (No model.)

*To all whom it may concern:*

Be it known that I, JAMES B. GATEWOOD, a citizen of the United States of America, and a resident of Huntington, county of Cabell, State of West Virginia, have invented certain new and useful Improvements in Tobacco-Harvesting Knives, of which the following is a full, clear, and exact specification, reference being had to the accompanying drawings, in which—

Figure 1 is perspective view showing the manner of using the knife in splitting the growing stalk of tobacco; Fig. 2, a detail perspective view of the knife; Fig. 3, a vertical longitudinal section of the shank and the blade; Fig. 4, a horizontal sectional view taken through the blade and the bifurcated part of the shank, the two halves of the stalk being shown in dotted lines.

The object of this invention is to provide a small tool for harvesting green tobacco in the field and preparing it for curing, as more fully hereinafter set forth.

The invention consists of novel features of construction hereinafter described and claimed.

The shank A of the knife is provided with a cross-bar at its upper end for convenience in grasping it with the hand, and at its other end it is somewhat enlarged and formed into a head which is substantially rectangular in cross-section and is tapered to a point. This head is slotted diagonally from its point to near its enlarged upper part, and in this slot is fastened the blade B, whose lower edge is sharpened into a cutting edge. This blade fits the slot closely, so that the two parts C of the head portion, formed by the bifurcation of the head, lie upon the opposite flat faces of the blade. The ends of the parts C terminate short of the cutting edge, and the ridge or corner of each of these parts extends entirely to the point.

In harvesting green tobacco in the field with this knife the operator first slits the stalk vertically, beginning near the top of the stalk, as shown in Fig. 1, and carrying the slit down to near the butt-end of the stalk, after which the stalk is cut down by chopping it off with the knife at a point below the termination of the slit. In slitting the stalk the knife is inserted so that the tapered ridged parts C will enter between the two halves of the stalk and engage the pith, as shown in dotted lines in Fig. 4, so that as the knife is forced down the length of the stalk these tapered parts C will compress the pith in each half of the stalk and the knife will be vertically guided the full length of the slitted portion. The advantage in this lies in the fact that the pith inside of the stalk will be left perfectly smooth throughout the slitted portion, and thus leaving the pith smooth will insure the stalk curing faster and better than when cut in the old way. It will also be seen that the knife will be guided truly during the slitting operation, thereby preventing it wabbling and injuring the stalk.

Having thus fully described my invention, what I claim, and desire to secure by Letters Patent, is—

In a tobacco-harvesting implement, the combination of a handled shank having a head portion upon one end, said head portion being tapered toward its lower end and being substantially rectangular in cross-section and carrying a knife-blade, said blade being inserted in a diagonal bifurcation in the end of said head portion, the triangular or ridged parts formed by this bifurcation of the head lying on opposite sides of the blade and being tapered toward the cutting edge of the blade, substantially as set forth.

In testimony whereof I hereunto affix my signature, in the presence of two witnesses, this 13th day of April, 1903.

JAMES B. GATEWOOD.

Witnesses:
GEO. S. WALLACE,
THOS. W. TAYLOR.